Nov. 3, 1931.   C. E. HENDRIX   1,830,736
ATTACHMENT FOR CARBURETOR CHOKERS
Filed Feb. 24, 1930
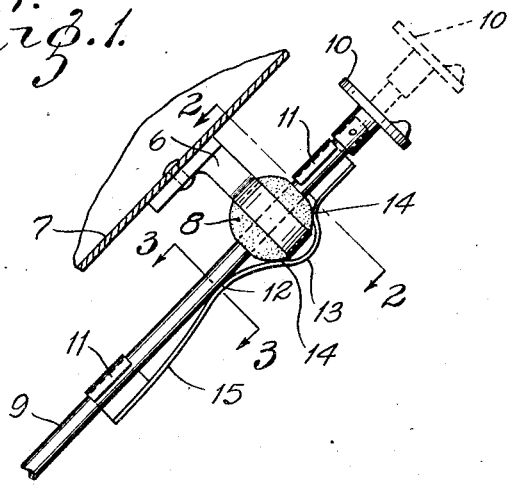
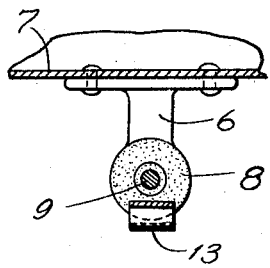
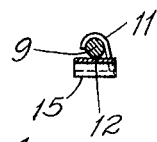
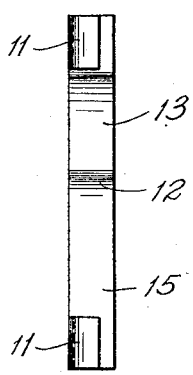
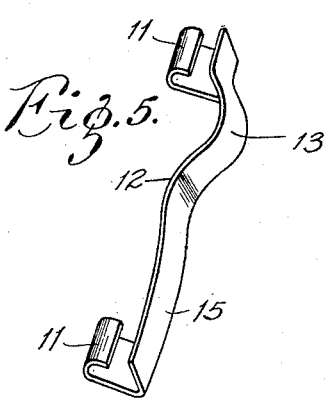
INVENTOR:
C. E. HENDRIX.
By Albert J. McCauley
ATTORNEY Patented Nov. 3, 1931

1,830,736

UNITED STATES PATENT OFFICE

CHARLES E. HENDRIX, OF JEFFERSON CITY, MISSOURI

ATTACHMENT FOR CARBURETOR CHOKERS

Application filed February 24, 1930. Serial No. 430,568.

This invention relates to attachments for carburetor chokers, and more particularly to a friction device adapted to retain a choker in the positions to which it is adjusted. Automobiles are usually equipped with devices to perform this function, but in some automobiles the choker rods must be held by the operators during the entire period in which the chokers are effective, and when such rods are released, the chokers are restored, by means of springs, to ineffective positions. This is very objectionable, especially in cold weather when the choker must remain in service for a relatively long period of time, and in actual practice the operator will often use one hand to retain the choker in service, while using the other hand to operate the gear shift lever and steering wheel.

One of my objects is to produce a simple and inexpensive friction device adapted to be easily and quickly attached to a choker. A further object is to produce an efficient device of this kind adapted to frictionally secure a choker rod in the positions to which it is adjusted, without in any way interfering with the other operations, or adjustments of the carburetor. Another object is to produce an attachment in the form of a spring adapted to interlock with the choker rod, and also with a support near said rod, so that the attachment can be quickly installed by hand, without using a tool of any kind.

A still further object is to provide a device of this kind adapted to receive and cooperate with the choker of a Ford, model A, automobile, as the choker of this automobile is automatically restored to its ineffective position when the operating rod is released. However, the new attachment will frictionally secure said rod in the positons to which it is adjusted, and thus allow the operator to use both hands in operating the car while the choker is in service.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. 1 is a side view, partly in section, showing the attachment applied to the choker of a Ford automobile.

Fig. 2 is a section on the line 2—2 in Fig. 1.

Fig. 3 is a section on the line 3—3 in Fig. 1.

Fig. 4 is a rear view of the attachment.

Fig. 5 is a perspective view of the attachment.

To illustrate one form of the invention, I have shown certain parts of a Ford automobile, including a bracket 6 secured to and extending from a portion 7 of the automobile, the outer end of said bracket containing a spherical rubber member 8 in which the choker rod 9 is slidably mounted, said rod having a disk 10 at its upper end which serves as a handle in operating the choker.

The rubber member 8 serves as a support, or guide, for the upper portion of the rod 9, but said rod is loosely mounted in said member 8 and free to move longitudinally therein. In the automobile referred to, the rubber member 8 serves as a sound deadener, but not as a friction device.

The carburetor is adjusted by turning the disk 10 to rotate the rod 9, and the choker is operated by moving the rod 9 longitudinally in the guide, or support, formed by the member 8.

The simple attachment herein shown is a single piece of metal preferably a leaf-spring, adapted to interlock with the rod 9 and also with the support 8. This spring has friction elements 11 in the form of hooks which extend laterally at the ends of the spring and frictionally engage one side of the rod 9, while an inwardly bowed friction element 12 engages the opposite side. The rod is thus confined between friction elements.

To prevent, or limit, longitudinal displacement of the friction device, a retaining element 13 is bowed outwardly from the inwardly bowed friction element 12. This retaining element 13 receives and interlocks with a portion of the support 8 and it is not necessary for the retaining element to conform to the shape of the support 8, but said element 13 is preferably shaped to provide abutments at 14 which engage opposite sides of the support 8 to prevent undue displacement of the friction device when the rod 9 is moved longitudinally. In this arrangement of the retaining element 13, the rod 9 is not forced into frictional engagement with the rubber support 8. The friction is obtained at the elements 11 and 12, while the support 8 prevents longitudinal movement of the friction device.

The bowed elements 12 and 13 may be in the form of reverse curves extending from the hook 11 at the top of the spring and merging into an arm 15 which extends to the lower hook 11.

The friction spring secures the choker rod in all of the positions to which it is adjusted, and the choking may be gradually reduced by intermittently pushing the rod to gradually shift it from the position shown by dotted lines in Fig. 1, to the position shown by full lines.

To apply the attachment to the choker, it is merely necessary to interlock one of the hooks 11 with the rod 9, locate the bowed retaining element 13 at the support 8 as shown in Fig. 1, and then interlock the other hook 11 with the rod 9. This can be very easily and quickly done by hand without using a tool of any kind.

The friction device is thus arranged longitudinally of the rod 9, where it has a neat appearance, and does not interfere with any other part of the equipment. The carburetor may still be adjusted in the usual way by turning the disk 10.

I claim:

1. In an attachment for a carburetor choker provided with a support and a choker rod movable longitudinally in said support, a friction device comprising a spring having a bowed portion interlocked with said support to secure said friction device, said spring having friction elements engaging said rod at opposite sides of said support to yieldingly secure said rod to said support.

2. In an attachment for a carburetor choker provided with a support and a choker rod movable longitudinally in said support, a friction device comprising a spring interlocked with said support to secure said friction device, said spring having integral friction elements in the form of hooks engaging and interlocked with said rod to yieldingly secure said rod to said support.

3. In an attachment for a carburetor choker provided with an operating rod, a friction device comprising a spring having integral friction elements engaging and interlocked with said rod, said spring being provided with a retaining element to prevent displacement of the friction device.

4. In an attachment for a carburetor choker provided with an operating rod, a friction device comprising a spring having integral friction elements in the form of hooks interlocked with and frictionally engaging one side of said rod, said spring also having a friction element engaging the opposite of said rod and a retaining element to prevent displacement of the friction device.

5. In an attachment for a carburetor choker provided with a support and a choker rod movable longitudinally therein, a friction device comprising a spring having integral friction elements engaging opposite sides of said rod, said spring also having an extended retaining element interlocked with said support to secure the friction device.

6. In an attachment for a carburetor choker provided with a support and a choker rod movable longitudinally therein, a friction device comprising a spring having integral friction elements at its ends engaging one side of said rod and an intermediate friction element engaging the opposite side of said rod, said spring also having an extended retaining element interlocked with and adapted to engage opposite sides of said support to secure the friction device.

7. In an attachment for a carburetor choker provided with a support and a choker rod movable longitudinally therein, a friction device comprising a spring having friction elements at its ends in the form of hooks interlocked with and frictionally engaging one side of said rod, said spring being provided with an inwardly bowed intermediate friction element engaging the opposite side of said rod and an outwardly bowed retaining element interlocked with said support to secure the friction device.

8. In an attachment for a carburetor choker provided with a support and a choker rod movable longitudinally therein, a friction device comprising a spring having friction elements at its ends in the form of hooks interlocked with and frictionally engaging one side of said rod, said spring being provided with an intermediate friction element engaging the opposite side of said rod and a retaining element interlocked with said support, said retaining element having abutments cooperating with opposite sides of said support to prevent displacement of the spring.

9. In an attachment for a carburetor choker provided with a guide and a choker rod slidable therein, a friction device comprising a leaf spring arranged longitudinally of said rod, said spring having friction elements at its ends in the form of hooks interlocked with and frictionally engaging one side of said rod, said spring being provided with an inwardly bowed intermediate friction element engaging the opposite side of said rod and an outwardly bowed retaining element interlocked with said guide, said retaining element having abutments cooperating with opposite sides of said guide to prevent longitudinal displacement of the friction device.

In testimony that I claim the foregoing I hereunto affix my signature.

CHARLES E. HENDRIX.